(12) United States Patent
Horio et al.

(10) Patent No.: US 7,256,966 B2
(45) Date of Patent: Aug. 14, 2007

(54) RAMP MADE OF POLYOXYMETHYLENE RESIN

(75) Inventors: Mitsuhiro Horio, Sodegaura (JP); Hiroshi Tsukahara, Kurashiki (JP); Yuuji Yoshinaga, Sodegaura (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 0 days.

(21) Appl. No.: 10/497,963

(22) PCT Filed: Dec. 19, 2002

(86) PCT No.: PCT/JP02/13322

§ 371 (c)(1),
(2), (4) Date: Jun. 9, 2004

(87) PCT Pub. No.: WO03/055945

PCT Pub. Date: Jul. 10, 2003

(65) Prior Publication Data

US 2005/0088782 A1    Apr. 28, 2005

(30) Foreign Application Priority Data

Dec. 25, 2001 (JP) .............................. 2001-391258
Jul. 31, 2002 (JP) .............................. 2002-223034

(51) Int. Cl.
*G11B 5/54* (2006.01)
(52) U.S. Cl. .................. 360/254.8; 360/254.7
(58) Field of Classification Search ..................... None
See application file for complete search history.

(56) References Cited

U.S. PATENT DOCUMENTS

| 5,306,772 | A |   | 4/1994  | Mimura et al. |
|---|---|---|---|---|
| 5,354,798 | A | * | 10/1994 | Tsukahara et al. ........... 524/413 |
| 5,420,170 | A | * | 5/1995  | Lutter et al. ................ 521/159 |
| 6,151,190 | A |   | 11/2000 | Yamamoto et al. ...... 360/99.06 |
| 6,194,515 | B1 | * | 2/2001  | Shinohara et al. ........ 525/92 A |
| 6,271,302 | B1 | * | 8/2001  | Matsushima ................. 524/542 |
| 6,444,777 | B1 | * | 9/2002  | Genz et al. .................... 528/60 |
| 6,633,534 | B1 | * | 10/2003 | Tosaki et al. ............ 369/275.3 |
| 6,737,475 | B1 | * | 5/2004  | Tajima et al. ................. 525/63 |
| 2001/0040769 | A1 |   | 11/2001 | Takami ..................... 360/254.7 |
| 2002/0123570 | A1 | * | 9/2002  | Kudou et al. ............... 525/107 |
| 2002/0186510 | A1 | * | 12/2002 | Feliss et al. ............. 360/254.8 |
| 2003/0043510 | A1 | * | 3/2003  | Miyamoto et al. ....... 360/254.7 |

FOREIGN PATENT DOCUMENTS

| DE | 19981597 T1 |   | 5/2001 |
|---|---|---|---|
| DE | 10029533 A1 |   | 12/2001 |
| JP | 04126758 | * | 4/1992 |
| JP | 6-172612 A |   | 6/1994 |
| JP | 7-207117 A |   | 8/1995 |
| JP | 8-127703 A |   | 5/1996 |
| JP | 10-125032 A |   | 5/1998 |
| JP | 10-237268 | * | 8/1998 |
| JP | 10-237268 A |   | 9/1998 |
| JP | 10237268 | * | 9/1998 |
| JP | 11-189702 A |   | 7/1999 |
| JP | 2001-297548 A |   | 10/2001 |
| JP | 2002-20578 A |   | 1/2002 |
| JP | 2002020578 | * | 1/2002 |
| WO | WO 99/43751 A1 |   | 9/1999 |
| WO | WO 01/32775 A1 |   | 5/2001 |
| WO | WO 01/42357 A1 |   | 6/2001 |

* cited by examiner

*Primary Examiner*—Wayne Young
*Assistant Examiner*—Linh T. Nguyen
(74) *Attorney, Agent, or Firm*—Birch, Stewart, Kolasch & Birch, LLP

(57) ABSTRACT

A ramp for hard discs which is obtained by molding a resin composition containing
(A) a polyoxymethylene resin, and
(B) at least one polymeric lubricant selected from the group consisting of (b-1) a polyolefin resin, and (b-2) a polymer obtained by polymerizing an isocyanate compound and a polyalkylene oxide, and which has an excellent sliding property and no deterioration of sliding property due to solvent washing.

24 Claims, No Drawings

RAMP MADE OF POLYOXYMETHYLENE RESIN

TECHNICAL FIELD

The present invention relates to a ramp for hard discs which has been molded from a polyoxymethylene resin composition containing a particular polymeric lubricant, and which has an excellent sliding property and no deterioration of the sliding property even after solvent washing.

BACKGROUND ART

Polyoxymethylene resins have been widely used not only for various mechanism parts but also office automation equipment and the like as an engineering resin having balanced mechanical properties and excellent wear resistance. However, the polyoxymethylene resin itself cannot give sufficient sliding property to molded articles, and hence a low molecular weight lubricant such as a fatty acid ester, polyethylene glycol, silicone or the like has been added to the polyoxymethylene resin.

As a technique of using a polyoxymethylene resin for such a ramp material for hard discs, JP-A 2001-297548 (US 2001-040769 A1) discloses use of a resin material having a tensile elongation of not less than 30%, and a polyacetal resin is used as the resin material. Furthermore, as a lubricant there are cited fluorine compounds such as PTFE, phosphazene type lubricants, carnauba wax, polyethylene wax, metal soaps, and the like.

When a usual polyoxymethylene resin containing no lubricant was used as a hard disc ramp material, no deterioration of sliding property was found due to washing with a solvent (which includes halogen-containing solvents such as trichloroethylene, trichloroethane, and various chlorofluorocarbons, aliphatic and aromatic hydrocarbons, alcohols, liquefied gases such as liquefied carbon dioxide gas, surfactant-containing water and pure water), but there was a problem that the level of the friction coefficient was high. On the other hand, a polyoxymethylene resin material having incorporated therein a lubricant such as a fatty acid ester, polyethylene glycol, silicone or the like to improve frictional abrasion, had excellent sliding property before solvent washing but showed remarkable deterioration of sliding property after solvent washing. Studies to prevent such deterioration of sliding property due to solvent washing have not been carried out.

In Japanese Patent Application 2001-535463 (the corresponding publication, WO 01/32775), the present inventors disclose that when a polyolefin resin grafted with a silicone gum is used as a lubricant, the sliding property of molded articles is not deteriorated even after washing with a solvent in the course of dry cleaning or the like. However, such a lubricant contains a silicone component which gives an adverse influence to the magnetic record of hard discs, and hence it was impossible to use such a lubricant as a ramp material for hard discs. Therefore, there is a need for a ramp material which does not contain a silicone component and which does not show deterioration of sliding property (friction coefficient/abrasion amount) due to solvent washing.

In this connection, in the case of phosphazene type lubricants, carnauba wax, polyethylene wax, and metal soaps disclosed as a lubricant in the above JP-A 2001-297548 (US 2001-040769 A1) the sliding property was deteriorated by solvent washing, and in the case of fluorine compounds such as PTFE deterioration of the sliding property due to solvent washing was not found, but improvement in the friction coefficient was insufficient.

Furthermore, it is disclosed in WO 99/43751 to add a polyolefin resin (b-1) used as the component (B) of the present invention to a polyoxymethylene resin, and it is disclosed in JP-A 2002-20578 to add a polymer (b-2) obtained by polymerizing an isocyanate compound and a polyalkylene oxide to a polyoxymethylene resin. However, it is not disclosed at all therein to use these materials as a ramp material for hard discs.

DISCLOSURE OF THE INVENTION

The present inventors have studied various lubricants to be added to a polyoxymethylene resin. As a result, they have found that a ramp material for hard discs which has excellent sliding property and which does not show deterioration of sliding property even after solvent washing, can be obtained by use of a polymeric lubricant selected from the group consisting of a polyolefin resin and a polymer obtained by polymerizing an isocyanate compound and a polyalkylene oxide. Thus, the present invention has been accomplished.

That is, the present invention relates to a ramp for hard discs which is obtained by molding a resin composition containing as essential components
(A) 100 parts by weight of a polyoxymethylene resin, and
(B) 0.1 to 10 parts by weight of at least one polymeric lubricant selected from the group consisting of (b-1) a polyolefin resin, and (b-2) a polymer obtained by polymerizing an isocyanate compound and a polyalkylene oxide, and furthermore containing as optional components
(C) 0 to 50 parts by weight of an inorganic filler having an average particle diameter of not more than 30 µm, and/or
(D) 0 to 10 parts by weight of a lubricant.

BEST MODE FOR CARRYING OUT THE INVENTION

The polyoxymethylene resin used as the component (A) in the present invention is at least one selected from the group consisting of homopolymers prepared by polymerizing formaldehyde or its cyclic oligomers such as the trimer, trioxane or the tetramer, tetraoxane, and blocking both terminals of the resultant polymer with an ether or ester group; oxymethylene copolymers containing 0.1 to 20 mole % based on oxymethylene of oxyalkylene units having 2 to 8 carbons prepared by copolymerizing formaldehyde or its trimer, trioxane or tetramer, tetraoxane with ethylene oxide, propylene oxide, 1,3-dioxolane, a formal of glycol, a formal of diglycerol or the like; those which have furthermore branched molecular chains; and oxymethylene block polymers containing 50 or more weight % of a segment consisting of oxymethylene units and 50 or less weight % of another segment. As the oxymethylene block polymers, preferable are a block polymer of a polyalkylene glycol with oxymethylene homopolymer disclosed in JP-A 57-31918 (U.S. Pat. No. 4,377,667) and a block polymer of hydrogenated polybutadiene and an oxymethylene copolymer disclosed in WO 01/09213.

Furthermore, these polyoxymethylene resins can be selected depending on their desired properties. From the viewpoints of sliding property and rigidity, homopolymers and copolymers containing a small amount of a comonomer can be preferably used. From the viewpoints of heat stability and impact resistance, copolymers containing a large amount of a comonomer and block polymers of hydrogenated polybutadiene and an oxymethylene copolymer can be preferably used.

For the ramp material for hard discs of the present invention, copolymers are preferable in the point of thermal stability, and furthermore copolymers having a small amount of a comonomer are the most preferable in the point of balance between sliding property and thermal stability. Concretely, the amount of comonomer based on oxymethylene units is preferably 0.1 to 2.0 mole %, more preferably 0.1 to 1.5 mole %, and most preferably 0.2 to 0.8 mole %. Furthermore, the melt flow rate (measured under the conditions of ASTM-D1238-57T) of the polyoxymethylene resin used in the present invention is in the range of generally 0.5 to 100 g/10 minutes, preferably 1.0 to 80 g/10 minutes, more preferably 5 to 60 g/10 minutes, and most preferably 7 to 50 g/10 minutes. When the melt flow rate is in the range of 0.5 to 100 g/10 minutes, fabrication is easy and endurance becomes good.

In the polyoxymethylene resin of the present invention, there can be used stabilizers which have been used in the conventional polyoxymethylene resin, for example, a heat stabilizer, a weather resistant stabilizer, a light resistant stabilizer and the like, solely or in a combination thereof.

As the heat stabilizer, there can be used preferably an antioxidant, a scavenger of formaldehyde or formic acid, and a combination thereof.

As the antioxidant, there can be used preferably hindered phenol antioxidants such as triethylene glycol-bis-(3-(3-t-butyl-5-methyl-4-hydroxyphenyl)-propionate), tetrakis-(methylene-3-(3',5'-di-t-butyl-4'-hydroxyphenyl)propionate)methane and the like.

As the scavenger of formaldehyde or formic acid, there are cited (a) compounds and polymers containing formaldehyde-reactive nitrogen, and (b) hydroxides, inorganic acid salts, and carboxylic acid salts of alkali metals or alkaline earth metals.

As the compounds and polymers (a) containing formaldehyde-reactive nitrogen, there are cited dicyandiamide, melamine, melamine-formaldehyde polycondensate, polyamide resin, poly-β-alanine, polyacrylamide and the like.

As the hydroxides, inorganic acid salts, and carboxylic acid salts (b) of alkali metals or alkaline earth metals, there are cited, for example, hydroxides of sodium, potassium, magnesium, calcium, barium and the like, carbonates, phosphates, silicates, borates and carboxylic acid salts of the above metals. Calcium salts are most preferable, and concretely there are cited calcium hydroxide, calcium carbonate, calcium phosphate, calcium silicate, calcium borate, and fatty acid calcium salts (calcium stearate, calcium myristate and the like). Furthermore, these fatty acid salts may be substituted by hydroxyl groups.

As the weather or light resistant stabilizer, preferable are (a) benzotriazole substances, (b) oxalic acid anilide substances, and (c) hindered amine substances. These substances may be used solely or in a combination of two or more. Above all, particularly preferable is a combination of at least one of benzotriazole substances or oxalic acid anilide substances and a hindered amine substance.

A preferable combination of stabilizers in the resin composition of the present invention is a combination of a hindered phenol [particularly triethylene glycol-bis-(3-(3-t-butyl-5-methyl-4-hydroxyphenyl)-propionate) or tetrakis-(methylene-3-(3',5'-di-t-butyl-4'-hydroxyphenyl)propionate) methane], a polymer containing formaldehyde-reactive nitrogen (particularly polyamide resin or poly-β-alanine), and a fatty acid salt of an alkaline earth metal (particularly fatty acid calcium salt). Furthermore, the preferable amounts of the stabilizers to be added are 0.05 to 0.5 weight % of a hindered phenol, 0.05 to 0.5 weight % of a polymer containing formaldehyde-reactive nitrogen, and 0.01 to 0.3 weight % of a fatty acid salt of an alkaline earth metal (particularly fatty acid calcium salt), on the basis of the amount of polyoxymethylene resin.

As the component (B), the polymeric lubricant in the present invention, there is used at least one polymeric lubricant selected from the group consisting of (b-1) a polyolefin resin, and (b-2) a polymer obtained by polymerizing an isocyanate compound and a polyalkylene oxide.

The polyolefin resin (b-1) is a homopolymer or copolymer of an olefin compound represented by the general formula (1) or the modified polymer thereof.

(1)

wherein $R_1$ is a hydrogen atom or methyl group, and $R_2$ means a hydrogen atom, an alkyl group having 1 to 10 carbons, carboxyl group, an alkylcarboxyl group containing 2 to 5 carbons, an acyloxy group having 2 to 5 carbons, or vinyl group.

Specific examples of the homopolymer and copolymer include polyethylenes (high-density polyethylene, medium-density polyethylene, high-pressure low-density polyethylene, straight-chain low-density polyethylene, and ultra-low-density polyethylene), polypropylene, ethylene-propylene copolymer, ethylene-butene copolymer, ethylene-octene copolymer, propylene-butene copolymer, polybutene, hydrogenated polybutadiene, ethylene-acrylic ester copolymer, ethylene-methacrylic ester copolymer, ethylene-acrylic acid copolymer, ethylene-vinyl acetate copolymer and the like. As the modified polymers, there are cited graft copolymers grafted with one or more other vinyl compounds; those modified with an α,β-unsaturated carboxylic acid (acrylic acid, methacrylic acid, maleic acid, fumaric acid, itaconic acid, citraconic acid, nadic acid or the like) or those modified with the anhydride of such an α,β-unsaturated carboxylic acid (by simultaneous use of a peroxide as needed); and copolymers of olefinic compounds with acid anhydrides.

Above all, preferable are polyethylenes (high-pressure low-density polyethylene, straight-chain low-density polyethylene, and ultra-low-density polyethylene), ethylene-propylene copolymer, ethylene-butene copolymer, and ethylene-octene copolymer.

These polyolefin resins are not particularly limited, but their melt flow rate (based on ASTM-D1238-57T) is in the range of preferably 0.5 to 150 g/10 minutes, more preferably 3 to 120 g/10 minutes, and most preferably 5 to 100 g/10 minutes. When the melt flow rate is not less than 0.5 g/10 minutes, the sliding property becomes good, and when the melt flow rate is not more than 150 g/10 minutes, the thin-molding peeling becomes good.

Next, the polymer (b-2) obtained by polymerizing an isocyanate compound and a polyalkylene oxide can be produced by melting and kneading an isocyanate compound and a polyalkylene oxide by use of a reactor such as an extruder, a kneader, Banbury mixer or the like. In this connection, as needed, a low molecular weight diol compound may be added thereto while melting and kneading an isocyanate compound and a polyalkylene oxide. Furthermore, it is possible to use a solvent such as dimethylformamide, methyl ethyl ketone, or toluene, and an urethane-forming catalyst such as an organic metal compound such as dibutyltin laurate or dioctyltin laurate; an amine such as triethylamine or diazabicycloundecene; or the like. The details thereof are disclosed in JP-A 7-316421 and JP-A 8-92476.

As an isocyanate compound, for example, there can be cited at least one selected from the group consisting of tolylene diisocyanate, xylylene diisocyanate, naphthylene diisocyanate, diphenylmethane diisocyanate, isophorone diisocyanate, dicyclohexylmethane diisocyanate, cyclohexylene diisocyanate, diisocyanato methylhexane, hexamethylene diisocyanate, triphenylmethane triisocyanate, tris(isocyanato phenyl)thiophosphate, and the cyclic trimer of hexamethylene diisocyanate. Among them, preferable are tolylene diisocyanate, xylylene diisocyanate, naphthylene diisocyanate, and diphenylmethane diisocyanate, and more preferable are tolylene diisocyanate and diphenylmethane diisocyanate.

As a polyalkylene oxide, for example, there can be cited at least one selected from polyethylene glycol, ethylene oxide-propylene oxide copolymer, polypropylene glycol, poly-1,4-butane diol and polytetramethylene glycol, which have a polymerization degree in the range of 4 to 1,000, preferably 10 to 500.

As the low molecular weight diol compound to be used as needed, there can be cited ethylene glycol, propylene glycol, 1,4-butane diol, 1,6-hexane diol, and a polyalkylene oxide (polyethylene glycol, ethylene oxide-propylene oxide copolymer, polypropylene glycol, poly-1,4-butane diol, polytetramethylene glycol or the like) having a polymerization degree of less than 4. Above all, preferable are ethylene glycol, propylene glycol, 1,4-butane diol, and 1,6-hexane diol.

The weight average molecular weight of a polymer obtained by polymerizing an isocyanate compound and a polyalkylene oxide (and as needed a low molecular weight diol compound) is in the range of preferably 10,000 to 500,000 and more preferably 20,000 to 300,000 in polystyrene-reduced weight average molecular weight as measured by gel permeation chromatography using chloroform as a solvent. When the weight average molecular weight is not less than 10,000, the thin-molding peeling of the molded article becomes good, and when the weight average molecular weight is not more than 500,000, the sliding property and surface appearance become good.

The proportion of these polymeric lubricants (B) to be added is 0.1 to 10 parts by weight, preferably 0.2 to 7 parts by weight, and more preferably 0.5 to 5 parts by weight based on 100 parts by weight of a polyoxymethylene resin (A). When the proportion is not less than 0.1 part by weight, sufficient sliding property can be obtained, and when the proportion is not more than 10 parts by weight, the abrasion amount is small and the thin-molding peeling is good.

The inorganic filler having an average particle diameter of not more than 30 μm used as the component (C) in the present invention is explained hereinafter. As such an inorganic filler, there can be used acicular filler, particulate filler, platy filler or the like. Furthermore, these fillers can be used solely or in a combination of two or more.

Concretely, as acicular fillers, there are cited whiskers such as potassium titanate, zinc oxide, and titanium oxide, acicular wollastonite (calcium silicate), and the like. As particulate fillers, there are cited graphite, carbon black, conductive carbon black, silica, quartz powder, glass beads, glass powder, aluminum silicate, kaolin, talc, clay, diatomaceous earth, nepheline syenite, cristobalite, wollastonite (calcium silicate), iron oxide, zinc oxide, titanium oxide, alumina, calcium sulfate, barium sulfate, calcium carbonate, magnesium carbonate, dolomite, calcium phosphate, hydroxyapatite, silicon carbide, silicon nitride, boron nitride, various metal powders, and the like. As a platy filler, there is cited mica.

Regarding these fillers, both surface-treated ones and surface-untreated ones can be used, but in some cases it is preferable to use surface-treated ones from the standpoints of smoothness and mechanical characteristics of the molded article surface. As surface-treating agents, there can be used those which have been conventionally known. For example, there can be used various coupling agents such as silane type, titanate type, aluminum type, zirconium type and the like. Specifically, there are cited N-(2-aminoethyl)-3-aminopropyltriethoxysilane, 3-glycidoxypropyltrimethoxysilane, isopropyltristearoyl titanate, diisopropoxyaluminumethyl acetate, n-butyl zirconate and the like.

As the inorganic filler of the present invention, there are used inorganic fillers having a volume average particle diameter of not more than 30 μm from the viewpoint of providing the sliding property. A volume average particle diameter of more than 30 μm deteriorates the sliding property and hence is not preferable. This sliding property is greatly influenced also by the surface state of the inorganic filler particles. In more detail, in spherical inorganic fillers having a smooth surface the volume average particle diameter is not more than preferably 30 μm and more preferably 20 μm, and in the other acicular, particulate or platy inorganic fillers the volume average particle diameter is not more than preferably 30 μm, more preferably 10 μm, and further more preferably 5 μm. Specifically, preferable are glass beads, potassium titanate whiskers, wollastonites (acicular and particulate), calcium carbonate, talc, graphite, nepheline syenite, hydroxyapatite, silica, carbon black, conductive carbon black, and kaolin, and particularly preferable are glass beads, potassium titanate whiskers, wollastonites (acicular and particulate), and calcium carbonate.

When the inorganic filler (C) is used, the proportion thereof to be added is in the range of 0.5 to 50 parts by weight, preferably 1 to 50 parts by weight, more preferably 5 to 40 parts by weight, based on 100 parts by weight of the polyoxymethylene resin (A). A proportion of not less than 0.5 part by weight can give sufficient reinforcing effect as a filler, and a proportion of not more than 50 parts by weight can give good sliding property.

The lubricant used as the component (D) in the present invention is at least one selected from the group consisting of an alcohol, a fatty acid, an ester of an alcohol with a fatty acid, an ester of an alcohol with a dicarboxylic acid, a polyoxyalkylene glycol, and an olefin compound having an average polymerization degree of 10 to 500.

The alcohol may be a monohydric alcohol or a polyhydric alcohol.

As examples of the monohydric alcohol, there are cited saturated or unsaturated alcohols such as octyl alcohol, nonyl alcohol, decyl alcohol, undecyl alcohol, lauryl alcohol, tridecyl alcohol, myristyl alcohol, pentadecyl alcohol, cetyl alcohol, heptadecyl alcohol, stearyl alcohol, oleyl alcohol, nonadecyl alcohol, eicosyl alcohol, ceryl alcohol, behenyl alcohol, melissyl alcohol, hexyldecyl alcohol, octyldodecyl alcohol, decylmyristyl alcohol, decylstearyl alcohol, UNILIN Alcohol, and the like.

As the polyhydric alcohol, there are cited, for example, ethylene glycol, diethylene glycol, triethylene glycol, propylene glycol, dipropylene glycol, butanediol, pentanediol, hexanediol, glycerine, diglycerine, triglycerine, threitol, erythritol, pentaerythritol, arabitol, ribitol, xylitol, sorbite, sorbitan, sorbitol, and mannitol.

As the fatty acid, there are cited caproic acid, enanthic acid, caprylic acid, pelargonic acid, capric acid, undecylic acid, lauric acid, tridecylic acid, myristic acid, heptadecylic acid, palmitic acid, pentadecylic acid, stearic acid, nonadecanoic acid, arachic acid, behenic acid, lignoceric acid, cerotic acid, heptacosanoic acid, montanic acid, melissic acid, lacceric acid, undecylenic acid, oleic acid, elaidic acid, cetleic acid, erucic acid, brassidic acid, sorbic acid, linolic acid, linolenic acid, arachidonic acid, propiolic acid, and stearolic acid. Furthermore, there may be used naturally occurring fatty acids containing such a component or a mixture of them. These fatty acids may be substituted with hydroxyl groups, and there may be used a synthetic fatty acid obtained by carboxyl-modifying the terminal of unilin alcohol which is a synthetic aliphatic alcohol.

As the ester of an alcohol with a fatty acid, there are cited esters of the alcohols and fatty acids mentioned below.

The alcohol may be a monohydric alcohol or a polyhydric alcohol. As examples of the monohydric alcohol, there are cited saturated or unsaturated alcohols such as methyl alcohol, ethyl alcohol, propyl alcohol, butyl alcohol, amyl alcohol, hexyl alcohol, heptyl alcohol, octyl alcohol, nonyl alcohol, decyl alcohol, undecyl alcohol, lauryl alcohol, tridecyl alcohol, myristyl alcohol, pentadecyl alcohol, cetyl alcohol, heptadecyl alcohol, stearyl alcohol, oleyl alcohol, nonadecyl alcohol, eicosyl alcohol, ceryl alcohol, behenyl alcohol, melissyl alcohol, hexyldecyl alcohol, octyldodecyl alcohol, decylmyristyl alcohol, decylstearyl alcohol, unilin alcohol, and the like. As the polyhydric alcohol, there are cited polyhydric alcohols containing 2 to 6 carbon atoms, for example, ethylene glycol, diethylene glycol, triethylene glycol, propylene glycol, dipropylene glycol, butanediol, pentanediol, hexanediol, glycerine, diglycerine, triglycerine, pentaerythritol, arabitol, ribitol, xylitol, sorbite, sorbitan, sorbitol, mannitol, and the like.

As the fatty acid, there are cited caproic acid, enanthic acid, caprylic acid, pelargonic acid, capric acid, undecylic acid, lauric acid, tridecylic acid, myristic acid, heptadecylic acid, palmitic acid, pentadecylic acid, stearic acid, nonadecanoic acid, arachic acid, behenic acid, lignoceric acid, cerotic acid, heptacosanoic acid, montanic acid, melissic acid, lacceric acid, undecylenic acid, oleic acid, elaidic acid, cetleic acid, erucic acid, brassidic acid, sorbic acid, linolic acid, linolenic acid, arachidonic acid, propiolic acid, and stearolic acid. Furthermore, there may be used naturally occurring fatty acids containing such a component or a mixture of them. These fatty acids may be substituted with hydroxyl groups. Moreover, there may be used a synthetic fatty acid obtained by carboxyl-modifying the terminal of unilin alcohol which is a synthetic aliphatic alcohol.

Among the above alcohols, fatty acids, and esters of an alcohol with a fatty acid, preferable are esters of a fatty acid having 12 or more carbons with an alcohol, more preferable are esters of a fatty acid having 12 or more carbons with an alcohol having 10 or more carbons, and further more preferable are esters of a fatty acid having 12-30 carbons with an alcohol having 10-30 carbons.

As the ester of an alcohol with a dicarboxylic acid, there are cited monoesters, diesters and their mixtures of a saturated or unsaturated primary alcohol such as octyl alcohol, nonyl alcohol, decyl alcohol, undecyl alcohol, lauryl alcohol, tridecyl alcohol, myristyl alcohol, pentadecyl alcohol, cetyl alcohol, heptadecyl alcohol, stearyl alcohol, oleyl alcohol, nonadecyl alcohol, eicosyl alcohol, ceryl alcohol, behenyl alcohol, melissyl alcohol, hexyldecyl alcohol, octyldodecyl alcohol, decylmyristyl alcohol, decylstearyl alcohol, or UNILIN Alcohol with a dicarboxylic acid such as oxalic acid, malonic acid, succinic acid, glutaric acid, adipic acid, pimelic acid, suberic acid, azelaic acid, sebacic acid, undecanedioic acid, brassilic acid, maleic acid, fumaric acid, or glutaconic acid. Among these esters of an alcohol with a dicarboxylic acid, preferable are esters of an alcohol having 10 or more carbon atoms with a dicarboxylic acid.

As the polyoxyalkylene glycol compound, there are cited three kinds of compounds.

The first group is a polycondensation product of an alkylene glycol as a monomer. For example, there are cited polyethylene glycol, polypropylene glycol, block copolymers of ethylene glycol and propylene glycol, and the like. The range of their polymerization degree is preferably 5 to 1000, and more preferably 10 to 500.

The second group is an ether compound of the polycondensation products cited in the first group with an aliphatic alcohol. For example, there are cited polyethylene glycol oleyl ether (polymerization degree of ethylene oxide: 5-50), polyethylene glycol cetyl ether (polymerization degree of ethylene oxide: 5-50), polyethylene glycol stearyl ether (polymerization degree of ethylene oxide: 5-30), polyethylene glycol lauryl ether (polymerization degree of ethylene oxide: 5-30), polyethylene glycol tridecyl ether (polymerization degree of ethylene oxide: 5-30), polyethylene glycol nonylphenyl ether (polymerization degree of ethylene oxide: 2-100), polyethylene glycol octylphenyl ether (polymerization degree of ethylene oxide: 4-50), and the like.

The third group is an ester compound of the polycondensation products cited in the first group with a higher fatty acid. For example, there are cited polyethylene glycol monolaurate (polymerization degree of ethylene oxide: 2-30), polyethylene glycol monostearate (polymerization degree of ethylene oxide: 2-50), polyethylene glycol monooleate (polymerization degree of ethylene oxide: 2-50), and the like.

The olefin compound having an average polymerization degree of 10 to 500 is a compound represented by the following formula (2):

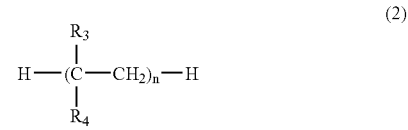

(2)

wherein $R_3$ and $R_4$ are selected from hydrogen, an alkyl group, an aryl group, and an ether group and they may be the same as or different from each other, and n is 10 to 500 of an average polymerization degree. As the alkyl group, for example there can be cited an ethyl group, propyl group, butyl group, hexyl group, octyl group, decyl group, lauryl group, cetyl group, stearyl group and the like. As the aryl group, for example there can be cited a phenyl group, p-butylphenyl group, p-octylphenyl group, p-nonylphenyl group, benzyl group, p-butylbenzyl group, tolyl group, xylyl group and the like. Furthermore, as the ether group, for example, there can be cited an ethyl ether group, propyl ether group, butyl ether group and the like.

As a monomer constituting such an olefin compound, specifically there are olefin monomers such as ethylene, propylene, 1-butene, 2-butene, isobutylene, 1-pentene, 2-pentene, 4-methyl-pentene, 2-methyl-1-butene, 3-methyl-1-butene, 2-methyl-2-butene, 1-hexene, 2,3-dimethyl-2-butene, 1-heptene, 1-octene, 1-nonene, 1-decene and the like, and diolefin monomers such as allene, 1,2-butadiene, 1,3-butadiene, 1,3-pentadiene, 1,4-pentadiene, 1,5-hexadiene, cyclopentadiene and the like. In the present invention, there may be used a compound obtained by copolymerizing two or more of these olefin monomers and diolefin monomers. When the olefin compound is a compound obtained by polymerizing a diolefin monomer, it is preferable from the viewpoint of improving heat stability to use an olefin compound wherein carbon-carbon double bonds are reduced as much as possible by use of a conventional hydrogenation method.

The average polymerization degree, n of olefin units constituting the olefin compound should be in the range of 10-500 as stated above, and is preferably in the range of 15-300 and more preferably in the range of 15-100. When the average polymerization degree n is less than 10, the sliding property over a long period of time is deteriorated and furthermore an adverse influence is given to mold staining property, which is not preferable. When n is more than 500, the initial sliding property is greatly deteriorated, which is not preferable.

When the lubricant (D) is used, the proportion thereof to be added is 0.1 to 10 parts by weight, preferably 0.2 to 7 parts by weight, and more preferably 0.3 to 5 parts by weight, on the basis of 100 parts by weight of polyoxymethylene resin. When the proportion is not less than 0.1 part by weight, sufficient improvement effect of sliding property can be obtained, and when the proportion is not more than 10 parts by weight, an increase of abrasion is suppressed and the thin-molding peeling is good.

Furthermore, in the polyoxymethylene resin composition of the present invention, as needed, there can be used various additives which are used in a polyoxymethylene resin, such as lubricant, impact resistance improver, other resins, crystal nucleating agents, releasing agent, dye, pigment and the like, in the range where the object of the present invention is not impaired.

In preparing the resin composition used in the present invention, there can be used the melt kneading machines which are generally used. As the melt kneading machines, there can be cited a kneader, roll mill, single screw extruder, twin-screw extruder, multi-screw extruder, and the like. The processing temperature at this time is preferably 180 to 240° C., and in order to keep quality and a good working environment, it is preferable to carry out substitution with an inert gas or deaeration with a single stage or multi-stage vent.

The ramp for hard discs of the present invention can be obtained by a molding method such as an injection molding method, hot-runner injection molding method, outsert molding method, insert molding method, gas assist hollow injection molding method, high-frequency heating injection molding method, injection compression molding method, compression molding, cutting operation of extruded moldings, and the like.

WORKING EXAMPLES

Hereinafter, the present invention will be specifically described by way of working examples. In the first place, components and evaluation methods used in the working examples and comparative examples are shown below.

Components to be Used (A) Polyoxymethylene Resin
   A-1: polyoxymethylene copolymer containing 0.5 mole % of 1,3-dioxolane as a comonomer and having a flexural modulus of 2900 MPa and a melt flow rate of 30 g/10 min. (ASTM D-1238-57T)
   A-2: polyoxymethylene copolymer containing 1.5 mole % of 1,3-dioxolane as a comonomer and having a flexural modulus of 2600 MPa and a melt flow rate of 30 g/10 min. (ASTM D-1238-57T)
   A-3: polyoxymethylene homopolymer, both terminals of which are blocked with acetyl groups, having a flexural modulus of 3000 MPa and a melt flow rate of 30 g/10 min. (ASTM D-1238-57T)

(B) Polymeric Lubricant Selected from the Group Consisting of (b-1) a Polyolefin Resin, and (b-2) a Polymer Obtained by Polymerizing an Isocyanate Compound and a Polyalkylene Oxide.

(b-1) Polyolefin Resin
   b-1-1: ethylene-butene copolymer (butene content 10 mole %, melt flow rate 70 g/10 min. (ASTM D-1238-57T))
   b-1-2: ethylene-butene copolymer (butene content 10 mole %, melt flow rate 40 g/10 min. (ASTM D-1238-57T))
   b-1-3: ethylene-butene copolymer (butene content 10 mole %, melt flow rate 5 g/10 min. (ASTM D-1238-57T))
   b-1-4: ethylene-butene copolymer (butene content 10 mole %, melt flow rate 0.5 g/10 min. (ASTM D-1238-57T))
   b-1-5: ethylene-butene copolymer (butene content 10 mole %, melt flow rate 150 g/10 min. (ASTM D-1238-57T))
   b-1-6: low-density polyethylene (melt flow rate 45 g/10 min. (ASTM D-1238-57T))
   b-1-7: low-density polyethylene (melt flow rate 90 g/10 min. (ASTM D-1238-57T))
   b-1-8: straight-chain low-density polyethylene (melt flow rate 40 g/10 min. (ASTM D-1238-57T))

(b-2) Polymer Obtained by Polymerizing an Isocyanate Compound and a Polyalkylene Oxide (and if Necessary a Low Molecular Weight Diol Compound)
   b-2-1: 89.0 parts by weight of polyethylene glycol having an average molecular weight of 2,000 and 11.0 parts by weight of diphenylmethane diisocyanate were subjected to melt kneading for 5 minutes by use of a PCM-30 twin-screw extruder (30 mmϕ, L/D=32) manufactured by Ikegai Tekkou K.K. at a cylinder temperature of 190° C. The resultant resin had a polystyrene-reduced weight average molecular weight of 200,000 as measured by gel permeation chromatography using chloroform as a solvent.
   b-2-2: 68.3 parts by weight of polyethylene glycol having an average molecular weight of 2,000, 18.5 parts by weight of polypropylene glycol having an average molecular weight of 1,000 and 13.2 parts by weight of diphenylenemethane diisocyanate were subjected to melt kneading for 5 minutes by use of a PCM-30 twin-screw extruder (30 mmϕ, L/D=32) manufactured by Ikegai Tekkou K.K. at a cylinder temperature of 190° C. The resultant resin had a polystyrene-reduced weight average molecular weight of 200,000 as measured by gel permeation chromatography using chloroform as a solvent.
   b-2-3: 62.7 parts by weight of polyethylene glycol having an average molecular weight of 2,000, 5.8 parts by weight of ethylene glycol and 31.5 parts by weight of diphenylmethane diisocyanate were subjected to melt kneading for 5 minutes by use of a PCM-30 twin-screw extruder (30 mmϕ, L/D=32) manufactured by Ikegai Tekkou K.K. at a cylinder temperature of 190° C. The resultant resin had a polystyrene-reduced weight average molecular weight of 180,000 as measured by gel permeation chromatography using chloroform as a solvent.

(C) Inorganic Filler
- C-1: potassium titanate whiskers having a length of 20 μm and a fiber diameter of 0.15 μm as measured by a scanning electron microscope and having a volume average particle diameter of 0.8 μm as measured by a laser type particle diameter measuring device
- C-2: wollastonite having a major axis of 10 μm and a minor axis of 1 μm as measured by a scanning electron microscope and having a volume average particle diameter of 3 μm as measured by a laser type particle diameter measuring device
- C-3: glass beads having a volume average particle diameter of 20 μm
- C-4: glass beads having a volume average particle diameter of 10 μm (D) Lubricant
- D-1: cetyl myristate
- D-2: polyethylene glycol (molecular weight=6000)
- D-3: polyethylene wax (Polywax 1000 manufactured by Petrolite Co., molecular weight=1000)
- D-4: PTFE (Lubron L-5 manufactured by Daikin Industries, Ltd.), comparative example.

Evaluation Method (1) Evaluation of Physical Properties

The pellets obtained in the working examples and comparative examples were dried for 3 hours at 80° C., and then were charged into a 5-ounce molding machine (IS-100E manufactured by Toshiba Machinery Co., Ltd.) wherein the cylinder temperature was adjusted at 200° C., to mold test pieces for evaluation of physical properties under the conditions of a mold temperature of 70° C. and cooling time of 30 seconds. The test pieces were subjected to the following tests.

① Melt flow rate: measured on the basis of ASTM D-1238-57T

② Tensile strength and tensile elongation: measured on the basis of ASTM D638

③ Flexural strength and flexural modulus: measured on the basis of ASTM D790

④ Izod impact strength: measured on the basis of ASTM D256

(2) Heat Stability

The pellets obtained in the working examples and comparative examples were dried for 3 hours at 100° C., and then were retained in a 1-ounce molding machine (TI-30G manufactured by Toyo Machinery and Metal Co., Ltd.) wherein the cylinder temperature was adjusted at 250° C., and then flat plates of 3 mm in thickness were molded under the conditions of a mold temperature of 70° C. and cooling time of 15 seconds, and the retention time until silver was generated on the surfaces of the molded plates was measured.

(3) Thin-Molding Peeling of Thin Molded Articles

The pellets obtained in the working examples and comparative examples were dried for 3 hours at 80° C., and then were charged into a 5-ounce molding machine (SH-75 manufactured by Sumitomo Heavy Industries, Ltd.) wherein the cylinder temperature was adjusted at 200° C., to mold vortical thin molded articles of 1 mm in thickness and 5 mm in width under the conditions of a mold temperature of 80° C., injection pressure of 75 kg/cm², and varied injection speed. Thin-molding peeling of the surfaces of the resultant molded articles was evaluated in accordance with the following criteria.

⊚: Thin-molding peeling was not found even at an injection speed of more than 80%.

○: Thin-molding peeling was found at an injection speed of not more than 80% but more than 40%.

Δ: Thin-molding peeling was found at an injection speed of not more than 40% but more than 20%.

X: Thin-molding peeling was found at an injection speed of not more than 20%.

(4) Sliding Property

① Before Solvent Washing

The pellets obtained in the working examples and comparative examples were dried for 3 hours at 80° C., and then were charged into a 1-ounce molding machine (TI-30G manufactured by Toyo Machinery and Metal Co., Ltd.) wherein the cylinder temperature was adjusted at 200° C., to mold flat plates of 3 mm in thickness as test pieces under the conditions of a mold temperature of 70° C. and cooling time of 20 seconds. The test pieces were subjected to measurement of friction coefficient and abrasion amount by use of a reciprocating friction abrasion machine (AFT-15MS type manufactured by Toyo Seimitu K.K.) under the conditions of load of 19.6 N, linear velocity of 30 mm/sec., reciprocating distance of 20 mm, number of reciprocations of 5,000 and environmental temperature of 23° C. As the opposite material, there was used a SUS304 test piece (a ball of 5 mm in diameter).

② After Solvent Washing

The flat plates of 3 mm in thickness used in the sliding property evaluation before solvent washing were immersed for 4 hours in a chloroform/methanol mixed solution (70/30 volume ratio) heated to 50° C., and then the surfaces thereof were washed with the same solvent, and drying was conducted for 2 hours by a hot air dryer of 60° C. The resultant test pieces were subjected to measurement of friction coefficient and abrasion amount by use of a reciprocating friction abrasion machine (AFT-15MS type manufactured by Toyo Seimitu K.K.) under the conditions of load of 19.6 N, linear velocity of 30 mm/sec., reciprocating distance of 20 mm, number of reciprocations of 5,000 and environmental temperature of 23° C. As the opposite material, there was used a SUS304 test piece (a ball of 5 mm in diameter).

Example 1

100 parts by weight of component (A-1) (containing as stabilizers 0.3 weight % of triethylene glycol-bis-[3-(3-t-butyl-5-methyl-4-hydroxyphenyl)propionate], 0.10 weight % of polyamide 66, and 0.15 weight % of calcium stearate), and 3 parts by weight of component (b-1-1) were blended uniformly by a blender, and then were subjected to melt kneading by use of a 25 mm φ twin-screw extruder of L/D=42 adjusted at 200° C. at the number of screw revolutions of 100 rpm and at a rate of 10 kg/hr. The extruded resin was cut into pellets by a strand cutter. The pellets were subjected to evaluation of various physical properties and performances. The results are shown in Table 1.

Examples 2-5

Pellets were prepared under conditions similar to those of Example 1 except that the component (b-1-1) of Example 1 was replaced by the components shown in Table 1. The pellets were subjected to evaluation of various physical properties and performances. The results are shown in Table 1.

Comparative Example 1

Pellets were prepared under conditions similar to those of Example 1 except that the component (b-1-1) of Example 1 was not added. The pellets were subjected to evaluation of various physical properties and performances. The results are shown in Table 1.

TABLE 1

|  |  |  |  | Example 1 | Example 2 | Example 3 | Example 4 | Example 5 | Comparative Example 1 |
|---|---|---|---|---|---|---|---|---|---|
| Composition | (A) Polyoxymethylene resin | | (A-1) | 100 | 100 | 100 | 100 | 100 | 100 |
| | | | (A-2) | | | | | | |
| | | | (A-3) | | | | | | |
| | (B) Polymeric lubricant | | (b-1-1) | 3 | | | | | |
| | | | (b-1-2) | | 3 | | | | |
| | | | (b-1-3) | | | 3 | | | |
| | | | (b-1-4) | | | | 3 | | |
| | | | (b-1-5) | | | | | 3 | |
| | | | (b-1-6) | | | | | | |
| | | | (b-1-7) | | | | | | |
| | | | (b-1-8) | | | | | | |
| Results | Physical properties | | Heat stability | 35 | 34 | 35 | 35 | 33 | 35 |
| | | | Tensile strength (MPa) | 58 | 58 | 57 | 57 | 55 | 65 |
| | | | Tensile elongation (%) | 30 | 29 | 27 | 25 | 19 | 35 |
| | | | Flexural strength (MPa) | 89 | 88 | 88 | 87 | 85 | 98 |
| | | | Flexural modulus (MPa) | 2800 | 2790 | 2770 | 2750 | 2650 | 2990 |
| | | | Izod impact strength (J/m) | 48 | 48 | 47 | 42 | 38 | 55 |
| | | | Thin-molding peeling | ◎ | ◎ | ◎ | ○ | Δ | ◎ |
| | Sliding properties to a metal (23° C.) | Before solvent washing | Friction coefficient (μ) | | | | | | |
| | | | once | 0.10 | 0.10 | 0.10 | 0.13 | 0.12 | 0.12 |
| | | | 10 times | 0.10 | 0.10 | 0.11 | 0.13 | 0.12 | 0.14 |
| | | | 100 times | 0.11 | 0.11 | 0.12 | 0.14 | 0.13 | 0.20 |
| | | | 1000 times | 0.11 | 0.11 | 0.13 | 0.18 | 0.14 | 0.22 |
| | | | 3000 times | 0.11 | 0.12 | 0.14 | 0.20 | 0.16 | 0.24 |
| | | | 5000 times | 0.12 | 0.12 | 0.16 | 0.22 | 0.18 | 0.26 |
| | | | Abrasion amount (μm) 5000 times | 5 | 6 | 11 | 25 | 15 | 10 |
| | | After solvent washing | Friction coefficient (μ) | | | | | | |
| | | | once | 0.09 | 0.09 | 0.10 | 0.13 | 0.11 | 0.14 |
| | | | 10 times | 0.10 | 0.10 | 0.11 | 0.13 | 0.12 | 0.18 |
| | | | 100 times | 0.11 | 0.11 | 0.12 | 0.14 | 0.13 | 0.20 |
| | | | 1000 times | 0.11 | 0.11 | 0.13 | 0.19 | 0.14 | 0.22 |
| | | | 3000 times | 0.11 | 0.11 | 0.14 | 0.20 | 0.16 | 0.26 |
| | | | 5000 times | 0.11 | 0.12 | 0.15 | 0.22 | 0.18 | 0.28 |
| | | | Abrasion amount (μm) 5000 times | 5 | 5 | 10 | 23 | 14 | 12 |

Examples 6-8 and Comparative Example 2

Pellets were prepared under conditions similar to those of Example 1 except that the amount of component (b-1-1) of Example 1 was changed to those shown in Table 2. The pellets were subjected to evaluation of various physical properties and performances. The results are shown in Table 2.

TABLE 2

|  |  |  |  | Example 6 | Example 7 | Example 8 | Comparative Example 2 |
|---|---|---|---|---|---|---|---|
| Composition | (A) Polyoxymethylene resin | | (A-1) | 100 | 100 | 100 | 100 |
| | | | (A-2) | | | | |
| | | | (A-3) | | | | |
| | (B) Polymeric lubricant | | (b-1-1) | 0.5 | 5 | 10 | 15 |
| | | | (b-1-2) | | | | |
| | | | (b-1-3) | | | | |
| | | | (b-1-4) | | | | |
| | | | (b-1-5) | | | | |
| | | | (b-1-6) | | | | |
| | | | (b-1-7) | | | | |
| | | | (b-1-8) | | | | |
| Results | Physical properties | | Heat stability | 35 | 35 | 34 | 30 |
| | | | Tensile strength (MPa) | 64 | 59 | 54 | 48 |
| | | | Tensile elongation (%) | 36 | 40 | 45 | 50 |
| | | | Flexural strength (MPa) | 96 | 86 | 75 | 66 |
| | | | Flexural modulus (MPa) | 2900 | 2600 | 2250 | 1880 |
| | | | Izod impact strength (J/m) | 52 | 55 | 60 | 60 |
| | | | Thin-molding peeling | ◎ | ◎ | Δ | X |

TABLE 2-continued

|  |  |  | Example 6 | Example 7 | Example 8 | Comparative Example 2 |
|---|---|---|---|---|---|---|
| Sliding properties to a metal (23° C.) | Before solvent washing | Friction coefficient (μ) |  |  |  |  |
|  |  | once | 0.11 | 0.09 | 0.10 | 0.12 |
|  |  | 10 times | 0.12 | 0.09 | 0.10 | 0.12 |
|  |  | 100 times | 0.14 | 0.10 | 0.11 | 0.13 |
|  |  | 1000 times | 0.16 | 0.10 | 0.12 | 0.14 |
|  |  | 3000 times | 0.18 | 0.11 | 0.13 | 0.16 |
|  |  | 5000 times | 0.19 | 0.11 | 0.15 | 0.18 |
|  |  | Abrasion amount (μm) 5000 times | 10 | 5 | 15 | 25 |
|  | After solvent washing | Friction coefficient (μ) |  |  |  |  |
|  |  | once | 0.10 | 0.09 | 0.10 | 0.12 |
|  |  | 10 times | 0.12 | 0.09 | 0.10 | 0.12 |
|  |  | 100 times | 0.14 | 0.10 | 0.11 | 0.13 |
|  |  | 1000 times | 0.16 | 0.10 | 0.12 | 0.15 |
|  |  | 3000 times | 0.17 | 0.11 | 0.14 | 0.16 |
|  |  | 5000 times | 0.18 | 0.11 | 0.15 | 0.18 |
|  |  | Abrasion amount (μm) 5000 times | 9 | 5 | 15 | 26 |

Examples 9-14

Pellets were prepared under conditions similar to those of Example 1 except that the component (b-1-1) of Example 1 was changed to those shown in Table 3. The pellets were subjected to evaluation of various physical properties and performances. The results are shown in Table 3.

Examples 15 and 16

Pellets were prepared under conditions similar to those of Example 1 except that the component (A-1) of Example 1 was changed to those shown in Table 3. The pellets were subjected to evaluation of various physical properties and performances. The results are shown in Table 3.

TABLE 3

|  |  |  | Example 9 | Example 10 | Example 11 | Example 12 | Example 13 | Example 14 | Example 15 | Example 16 |
|---|---|---|---|---|---|---|---|---|---|---|
| Composition | (A) Polyoxymethylene resin | (A-1) | 100 | 100 | 100 | 100 | 100 | 100 |  |  |
|  |  | (A-2) |  |  |  |  |  |  | 100 |  |
|  |  | (A-3) |  |  |  |  |  |  |  | 100 |
|  | (B) Polymeric lubricant | (b-1-1) |  |  |  |  |  |  | 3 | 3 |
|  |  | (b-1-2) |  |  |  |  |  |  |  |  |
|  |  | (b-1-3) |  |  |  |  |  |  |  |  |
|  |  | (b-1-4) |  |  |  |  |  |  |  |  |
|  |  | (b-1-5) |  |  |  |  |  |  |  |  |
|  |  | (b-1-6) | 3 |  |  |  |  |  |  |  |
|  |  | (b-1-7) |  | 3 |  |  |  |  |  |  |
|  |  | (b-1-8) |  |  | 3 |  |  |  |  |  |
|  |  | (b-2-1) |  |  |  | 3 |  |  |  |  |
|  |  | (b-2-2) |  |  |  |  | 3 |  |  |  |
|  |  | (b-2-3) |  |  |  |  |  | 3 |  |  |
| Results | Physical properties | Heat stability | 35 | 35 | 34 | 35 | 35 | 34 | 40 | 19 |
|  |  | Tensile strength (MPa) | 58 | 57 | 57 | 58 | 57 | 57 | 52 | 62 |
|  |  | Tensile elongation (%) | 30 | 29 | 29 | 30 | 29 | 29 | 34 | 30 |
|  |  | Flexural strength (MPa) | 89 | 87 | 88 | 89 | 87 | 88 | 77 | 93 |
|  |  | Flexural modulus (MPa) | 2800 | 2750 | 2770 | 2800 | 2750 | 2770 | 2400 | 2850 |
|  |  | Izod impact strength (J/m) | 48 | 47 | 48 | 48 | 47 | 48 | 54 | 50 |
|  |  | Thin-molding peeling | ⊚ | ⊚ | ⊚ | ⊚ | ⊚ | ⊚ | ⊚ | ⊚ |
|  | Sliding properties to a metal (23° C.) | Before solvent washing Friction coefficient (μ) |  |  |  |  |  |  |  |  |
|  |  | once | 0.13 | 0.12 | 0.12 | 0.13 | 0.12 | 0.12 | 0.12 | 0.10 |
|  |  | 10 times | 0.14 | 0.13 | 0.13 | 0.14 | 0.13 | 0.13 | 0.13 | 0.11 |
|  |  | 100 times | 0.15 | 0.14 | 0.14 | 0.15 | 0.14 | 0.14 | 0.14 | 0.11 |
|  |  | 1000 times | 0.16 | 0.15 | 0.15 | 0.16 | 0.15 | 0.15 | 0.16 | 0.12 |
|  |  | 3000 times | 0.17 | 0.15 | 0.15 | 0.17 | 0.15 | 0.15 | 0.18 | 0.14 |
|  |  | 5000 times | 0.17 | 0.16 | 0.16 | 0.17 | 0.16 | 0.16 | 0.18 | 0.15 |
|  |  | Abrasion amount (μm) 5000 times | 15 | 12 | 13 | 15 | 12 | 13 | 15 | 10 |

TABLE 3-continued

|  |  | Example 9 | Example 10 | Example 11 | Example 12 | Example 13 | Example 14 | Example 15 | Example 16 |
|---|---|---|---|---|---|---|---|---|---|
| After solvent washing | Friction coefficient (μ) | | | | | | | | |
| | once | 0.12 | 0.12 | 0.12 | 0.12 | 0.12 | 0.12 | 0.11 | 0.10 |
| | 10 times | 0.13 | 0.13 | 0.13 | 0.13 | 0.13 | 0.13 | 0.12 | 0.11 |
| | 100 times | 0.15 | 0.14 | 0.14 | 0.15 | 0.14 | 0.14 | 0.14 | 0.11 |
| | 1000 times | 0.16 | 0.15 | 0.15 | 0.16 | 0.15 | 0.15 | 0.16 | 0.12 |
| | 3000 times | 0.17 | 0.15 | 0.15 | 0.17 | 0.15 | 0.15 | 0.18 | 0.14 |
| | 5000 times | 0.17 | 0.16 | 0.16 | 0.17 | 0.16 | 0.16 | 0.18 | 0.15 |
| | Abrasion amount (μm) 5000 times | 15 | 13 | 13 | 15 | 13 | 13 | 14 | 10 |

Example 17

Pellets were prepared under conditions similar to those of Example 2 except that 1 part by weight of component (D-1) was further added in Example 2. The pellets were subjected to evaluation of various physical properties and performances. The results are shown in Table 4.

Example 18

Pellets were prepared under conditions similar to those of Example 12 except that 1 part by weight of component (D-2) was further added in Example 12. The pellets were subjected to evaluation of various physical properties and performances. The results are shown in Table 4.

Comparative Example 3

100 parts by weight of component (A-1) (containing as stabilizers 0.3 weight % of triethylene glycol-bis-[3-(3-t-butyl-5-methyl-4-hydroxyphenyl)propionate], 0.10 weight % of polyamide 66, and 0.15 weight % of calcium stearate), and 3 parts by weight of component (D-1) were blended uniformly by a blender, and then were subjected to melt kneading by use of a 25 mm φ twin-screw extruder of L/D=42 adjusted at 200° C. at the number of screw revolutions of 100 rpm and at a rate of 10 kg/hr. The extruded resin was cut into pellets by a strand cutter. The pellets were subjected to evaluation of various physical properties and performances. The results are shown in Table 4.

Comparative Examples 4-6

Pellets were prepared under conditions similar to those of Comparative Example 3 except that the kind and amount of the lubricant of Comparative Example 3 were changed to those shown in Table 4. The pellets were subjected to evaluation of various physical properties and performances. The results are shown in Table 4.

TABLE 4

|  |  |  | Example 17 | Example 18 | Comparative Example 3 | Comparative Example 4 | Comparative Example 5 | Comparative Example 6 |
|---|---|---|---|---|---|---|---|---|
| Composition | (A) Polyoxymethylene resin | (A-1) | 100 | 100 | 100 | 100 | 100 | 100 |
| | | (A-2) | | | | | | |
| | | (A-3) | | | | | | |
| | (B) Polymeric lubricant | (b-1-1) | | | | | | |
| | | (b-1-2) | 3 | | | | | |
| | | (b-1-3) | | | | | | |
| | | (b-1-4) | | | | | | |
| | | (b-1-5) | | | | | | |
| | | (b-1-6) | | | | | | |
| | | (b-1-7) | | | | | | |
| | | (b-1-8) | | | | | | |
| | | (b-2-1) | | 3 | | | | |
| | | (b-2-2) | | | | | | |
| | | (b-2-3) | | | | | | |
| | (D) Lubricant | (D-1) | 1 | | 3 | | | |
| | | (D-2) | | 1 | | 3 | | |
| | | (D-3) | | | | | 3 | |
| | | (D-4) | | | | | | 25 |
| Results | Physical properties | Heat stability | 32 | 35 | 30 | 33 | 33 | 25 |
| | | Tensile strength (MPa) | 56 | 57 | 56 | 58 | 50 | 47 |
| | | Tensile elongation (%) | 30 | 33 | 32 | 35 | 30 | 11 |
| | | Flexural strength (MPa) | 86 | 88 | 78 | 80 | 86 | 80 |
| | | Flexural modulus (MPa) | 2700 | 2760 | 2680 | 2700 | 2650 | 2520 |
| | | Izod impact strength (J/m) | 47 | 50 | 52 | 50 | 45 | 55 |
| | | Thin-molding peeling | ⊚ | ⊚ | ⊚ | ⊚ | X | ○ |

TABLE 4-continued

|  |  |  | Example 17 | Example 18 | Comparative Example 3 | Comparative Example 4 | Comparative Example 5 | Comparative Example 6 |
|---|---|---|---|---|---|---|---|---|
| Sliding properties to a metal (23° C.) | Before solvent washing | Friction coefficient (μ) | | | | | | |
| | | once | 0.09 | 0.11 | 0.09 | 0.09 | 0.10 | 0.10 |
| | | 10 times | 0.10 | 0.11 | 0.10 | 0.10 | 0.10 | 0.10 |
| | | 100 times | 0.10 | 0.12 | 0.10 | 0.11 | 0.11 | 0.11 |
| | | 1000 times | 0.10 | 0.12 | 0.12 | 0.14 | 0.12 | 0.12 |
| | | 3000 times | 0.10 | 0.13 | 0.12 | 0.15 | 0.14 | 0.15 |
| | | 5000 times | 0.11 | 0.14 | 0.13 | 0.15 | 0.16 | 0.18 |
| | | Abrasion amount (μm) 5000 times | 5 | 9 | 5 | 7 | 8 | 9 |
| | After solvent washing | Friction coefficient (μ) | | | | | | |
| | | once | 0.09 | 0.11 | 0.14 | 0.15 | 0.12 | 0.10 |
| | | 10 times | 0.10 | 0.11 | 0.15 | 0.16 | 0.13 | 0.10 |
| | | 100 times | 0.10 | 0.11 | 0.17 | 0.19 | 0.14 | 0.11 |
| | | 1000 times | 0.10 | 0.12 | 0.20 | 0.22 | 0.16 | 0.13 |
| | | 3000 times | 0.10 | 0.13 | 0.20 | 0.24 | 0.19 | 0.15 |
| | | 5000 times | 0.11 | 0.14 | 0.22 | 0.26 | 0.22 | 0.18 |
| | | Abrasion amount (μm) 5000 times | 5 | 9 | 17 | 20 | 20 | 12 |

Example 19

100 parts by weight of component (A-1) (containing as stabilizers 0.3 weight % of triethylene glycol-bis-[3-(3-t-butyl-5-methyl-4-hydroxyphenyl)propionate], 0.10 weight % of polyamide 66, and 0.15 weight % of calcium stearate), 3 parts by weight of component (b-1-1), and 10 parts by weight of component (C-1) were blended uniformly by a blender, and then were subjected to melt kneading by use of a 25 mm ϕ twin-screw extruder of L/D=42 adjusted at 200° C. at the number of screw revolutions of 100 rpm and at a rate of 10 kg/hr. The extruded resin was cut into pellets by a strand cutter. The pellets were subjected to evaluation of various physical properties and performances. The results are shown in Table 5.

Examples 20 and 21

Pellets were prepared under conditions similar to those of Example 19 except that component (D) was further added in Example 19 as shown in Table 5. The pellets were subjected to evaluation of various physical properties and performances. The results are shown in Table 5.

Example 22

100 parts by weight of component (A-1) (containing as stabilizers 0.3 weight % of triethylene glycol-bis-[3-(3-t-butyl-5-methyl-4-hydroxyphenyl)propionate], 0.10 weight % of polyamide 66, and 0.15 weight % of calcium stearate), 3 parts by weight of component (b-1-1), and 10 parts by weight of component (C-2) were blended uniformly by a blender, and then were subjected to melt kneading by use of a 25 mm ϕ twin-screw extruder of L/D=42 adjusted at 200° C. at the number of screw revolutions of 100 rpm and at a rate of 10 kg/hr. The extruded resin was cut into pellets by a strand cutter. The pellets were subjected to evaluation of various physical properties and performances. The results are shown in Table 5.

Example 23

Pellets were prepared under conditions similar to those of Example 22 except that component (D) was further added in Example 22 as shown in Table 5. The pellets were subjected to evaluation of various physical properties and performances. The results are shown in Table 5.

Example 24

100 parts by weight of component (A-1), polyoxymethylene resin (containing as stabilizers 0.3 weight % of triethylene glycol-bis-[3-(3-t-butyl-5-methyl-4-hydroxyphenyl)propionate], 0.10 weight % of polyamide 66, and 0.15 weight % of calcium stearate), 4 parts by weight of component (b-1-1), and 33.3 parts by weight of component (C-3) were blended uniformly by a blender, and then were subjected to melt kneading by use of a 25 mm ϕ twin-screw extruder of L/D=42 adjusted at 200° C. at the number of screw revolutions of 100 rpm and at a rate of 10 kg/hr. The extruded resin was cut into pellets by a strand cutter. The pellets were subjected to evaluation of various physical properties and performances. The results are shown in Table 5.

Examples 25 and 26

Pellets were prepared under conditions similar to those of Example 24 except that component (B) and component (C) were changed in Example 24 as shown in Table 5. The pellets were subjected to evaluation of various physical properties and performances. The results are shown in Table 5.

Example 27

Pellets were prepared under conditions similar to those of Example 26 except that component (D) was further added in Example 26 as shown in Table 5. The pellets were subjected to evaluation of various physical properties and performances. The results are shown in Table 5.

TABLE 5

| | | | Example 19 | Example 20 | Example 21 | Example 22 | Example 23 | Example 24 | Example 25 | Example 26 | Example 27 |
|---|---|---|---|---|---|---|---|---|---|---|---|
| Composition | (A) Polyoxymethylene resin | (A-1) | 100 | 100 | 100 | 100 | 100 | 100 | 100 | 100 | 100 |
| | | (A-2) | | | | | | | | | |
| | | (A-3) | | | | | | | | | |
| | (B) Polymeric lubricant | (b-1-1) | 3 | 3 | 3 | 3 | 3 | 4 | 4 | | |
| | | (b-2-3) | | | | | | | | 4 | 4 |
| | (c) Inorganic filler | (C-1) | 10 | 10 | 10 | | | | | | |
| | | (C-2) | | | | 10 | 10 | | | | |
| | | (C-3) | | | | | | 33.3 | | | |
| | | (C-4) | | | | | | | 33.3 | 33.3 | 33.3 |
| | (D) Lubricant | (D-1) | | 1 | | | | | | | |
| | | (D-2) | | | 1 | | | | | | 1 |
| | | (D-3) | | | | | 1 | | | | |
| Results | Physical properties | Heat stability | 28 | 25 | 25 | 30 | 30 | 25 | 25 | 30 | 30 |
| | | Tensile strength (MPa) | 59 | 57 | 57 | 54 | 53 | 39 | 43 | 42 | 40 |
| | | Tensile elongation (%) | 6 | 7 | 7 | 9 | 10 | 17 | 20 | 25 | 27 |
| | | Flexural strength (MPa) | 98 | 96 | 96 | 94 | 93 | 76 | 79 | 76 | 73 |
| | | Flexural modulus (MPa) | 4800 | 4680 | 4700 | 4400 | 4370 | 3400 | 3500 | 3500 | 3380 |
| | | Izod impact strength (J/m) | 34 | 35 | 36 | 36 | 36 | 35 | 38 | 42 | 45 |
| | | Thin-molding peeling | ◎ | ◎ | ◎ | ◎ | ◎ | ◎ | ◎ | ◎ | ◎ |
| Sliding properties to a metal (23° C.) | Before solvent washing | Friction coefficient (μ) | | | | | | | | | |
| | | once | 0.09 | 0.09 | 0.09 | 0.09 | 0.09 | 0.09 | 0.08 | 0.09 | 0.09 |
| | | 10 times | 0.10 | 0.10 | 0.10 | 0.10 | 0.10 | 0.10 | 0.09 | 0.09 | 0.09 |
| | | 100 times | 0.11 | 0.11 | 0.11 | 0.11 | 0.11 | 0.13 | 0.10 | 0.10 | 0.09 |
| | | 1000 times | 0.13 | 0.12 | 0.12 | 0.13 | 0.12 | 0.16 | 0.14 | 0.12 | 0.10 |
| | | 3000 times | 0.15 | 0.13 | 0.13 | 0.16 | 0.13 | 0.16 | 0.14 | 0.12 | 0.10 |
| | | 5000 times | 0.17 | 0.14 | 0.13 | 0.18 | 0.14 | 0.16 | 0.14 | 0.12 | 0.11 |
| | | Abrasion amount (μm) 5000 times | 15 | 10 | 10 | 18 | 11 | 9 | 6 | 6 | 5 |
| | After solvent washing | Friction coefficient (μ) | | | | | | | | | |
| | | once | 0.09 | 0.09 | 0.09 | 0.09 | 0.09 | 0.09 | 0.08 | 0.09 | 0.09 |
| | | 10 times | 0.09 | 0.10 | 0.10 | 0.10 | 0.10 | 0.09 | 0.08 | 0.09 | 0.09 |
| | | 100 times | 0.10 | 0.11 | 0.11 | 0.11 | 0.11 | 0.12 | 0.09 | 0.10 | 0.09 |
| | | 1000 times | 0.12 | 0.12 | 0.12 | 0.13 | 0.12 | 0.15 | 0.13 | 0.12 | 0.10 |
| | | 3000 times | 0.15 | 0.14 | 0.13 | 0.16 | 0.13 | 0.16 | 0.14 | 0.12 | 0.11 |
| | | 5000 times | 0.17 | 0.15 | 0.13 | 0.17 | 0.14 | 0.16 | 0.14 | 0.12 | 0.11 |
| | | Abrasion amount (μm) 5000 times | 15 | 12 | 10 | 16 | 11 | 9 | 6 | 6 | 5 |

As is clear from the results shown in the above Tables 1-5, in the conventional polyoxymethylene resins having low molecular weight lubricants incorporated therein, sliding properties (friction coefficient and abrasion amount) have been remarkably deteriorated by solvent washing. On the contrary, in the present polyoxymethylene resins having the specific polymeric lubricants contained therein, sliding properties have not been deteriorated at all even by solvent washing, and the friction coefficient has been greatly improved as compared with comparative examples having no polymeric lubricant added therein (comparison of Examples 1-5 and 9-14 with Comparative Examples 1 and 3-5). Furthermore, this trend was quite the same also in the case where specific inorganic fillers were further added (Examples 19, 22 and 24-26).

In the present compositions wherein low molecular weight lubricants were further added in addition to the specific polymeric lubricants, sliding properties have been further improved and deterioration of sliding properties due to solvent washing has been scarcely found (comparison of Example 19 with Examples 20 and 21, comparison of Example 22 with Example 23, and comparison of Example 26 with Example 27). The reason for this result is presumed to be that the polymeric lubricant and low molecular weight lubricant of the present invention were mixed and dispersed well and hence elution could be prevented.

INDUSTRIAL APPLICABILITY

The ramp for hard discs molded by use of the present composition has accomplished prevention of sliding property deterioration due to solvent washing which was difficult for the conventional polyoxymethylene resin compositions, and has enlarged use of polyoxymethylene resins as a ramp material for hard discs.

Furthermore, the polyoxymethylene resin composition of the present invention can be used not only for a ramp for hard discs but also as a sliding part such as a gear, cam, slider, lever, arm, guide, clutch, felt clutch, idler gear, pulley, roller, roll, key stem, key top, shutter, meter dial, buckle, fastener, hook, reel, shaft, joint, axis, bearing and the like. These sliding parts are used for applications such as VTR (Video Tape Recorder), video movie, digital video camera, camera and digital camera, cassette player, DAT (Digital Audio Taperecorder), LD (Laser Disk), MD (Mini Disk), CD (Compact Disk) [including CD-ROM (Read Only Memory), CD-R (Recordable) and CD-RW (Rewritable)], DVD (Digital Versatile Disk) [including DVD-ROM, DVD-R, DVD-RW, DVD+RW, DVD-RAM (Random Access Memory), DVD-Audio, and DVD-Multi], other Laser Disk Drives, MFD (Micro Floppy Disk), MO (Rewritable Magnet-Optical Disk) and the component types thereof. In recent years the structure of these recording devices has been miniaturized and highly integrated and furthermore hermetically closed. Therefore, in order to exclude dust, fat and oil, non-volatile solvents, substances giving influence to the recording medium and the like which are attached to the parts, in some cases the parts are used after washing them with a solvent (such as halogen-containing solvents represented by trichloroethylene, trichloroethane, and various chlorofluorocarbons, aliphatic and aromatic hydrocarbons, alcohols, liquefied carbon dioxide gas, surfactant-containing water and pure water, and the like). The composition of the present invention is useful also for such a use.

The invention claimed is:

1. A ramp which is obtained by molding a resin composition comprising:
   (A) 100 parts by weight of a polyoxymethylene resin; and
   (B) 0.1 to 10 parts by weight of at least one polymeric lubricant comprising (b-2) a polymer composed of an isocyanate compound and a polyalkylene oxide;
   and provided that said ramp is a ramp for a hard disc.

2. The ramp according to claim 1, the resin composition further comprising:
   (C) 0.5 to 50 parts by weight of an inorganic filler having an average particle diameter of not more than 30 μm, and/or
   (D) 0.1 to 10 parts by weight of a lubricant.

3. The ramp according to any one of claims 1 or 2, wherein the polyoxymethylene resin (A) is a copolymer having a comonomer amount of 0.1 to 2.0 mole %.

4. The ramp according to claim 2, wherein the inorganic filler (C) is a spherical and smooth-surfaced filler having a volume average particle diameter of not more than 30 μm.

5. The ramp according to claim 2, wherein the inorganic filler (C) is an acicular, particulate or platy filler having a volume average particle diameter of not more than 10 μm.

6. The ramp according to claim 2, wherein the lubricant (D) is at least one selected from the group consisting of an alcohol, a fatty acid, an ester of an alcohol with a fatty acid, an ester of a dicarboxylic acid with an alcohol, a polyoxyalkylene glycol, and an olefin compound having an average polymerization degree of 10 to 500.

7. The ramp according to any one of claims 1 or 2, wherein the ramp is used after it is washed with at least one solvent selected from the group consisting of halogen-containing solvents, aliphatic hydrocarbons, aromatic hydrocarbons, alcohols, liquefied carbon dioxide gas, surfactant-containing water, and pure water.

8. The ramp according to claim 3, wherein the inorganic filler (C) is a spherical and smooth-surfaced filler having a volume average particle diameter of not more than 30 μm.

9. The ramp according to claim 3, wherein the inorganic filler (C) is an acicular, particulate or platy filler having a volume average particle diameter of not more than 10 μm.

10. The ramp according to claim 3, wherein the lubricant (D) is at least one selected from the group consisting of an alcohol, a fatty acid, an ester of an alcohol with a fatty acid, an ester of a dicarboxylic acid with an alcohol, a polyoxyalkylene glycol, and an olefin compound having an average polymerization degree of 10 to 500.

11. The ramp according to claim 4, wherein the lubricant (D) is at least one selected from the group consisting of an alcohol, a fatty acid, an ester of an alcohol with a fatty acid, an ester of a dicarboxylic acid with an alcohol, a polyoxyalkylene glycol, and an olefin compound having an average polymerization degree of 10 to 500.

12. The ramp according to claim 5, wherein the lubricant (D) is at least one selected from the group consisting of an alcohol, a fatty acid, an ester of an alcohol with a fatty acid, an ester of a dicarboxylic acid with an alcohol, a polyoxyalkylene glycol, and an olefin compound having an average polymerization degree of 10 to 500.

13. The ramp according to claim 3, wherein the ramp is used after it is washed with at least one solvent selected from the group consisting of halogen-containing solvents, aliphatic hydrocarbons, aromatic hydrocarbons, alcohols, liquefied carbon dioxide gas, surfactant-containing water, and pure water.

14. The ramp according to claim 4, wherein the ramp is used after it is washed with at least one solvent selected from the group consisting of halogen-containing solvents, aliphatic hydrocarbons, aromatic hydrocarbons, alcohols, liquefied carbon dioxide gas, surfactant-containing water, and pure water.

15. The ramp according to claim 5, wherein the ramp is used after it is washed with at least one solvent selected from the group consisting of halogen-containing solvents, aliphatic hydrocarbons, aromatic hydrocarbons, alcohols, liquefied carbon dioxide gas, surfactant-containing water, and pure water.

16. The ramp according to claim 6, wherein the ramp is used after it is washed with at least one solvent selected from the group consisting of halogen-containing solvents, aliphatic hydrocarbons, aromatic hydrocarbons, alcohols, liquefied carbon dioxide gas, surfactant-containing water, and pure water.

17. A ramp which is obtained by molding a resin composition comprising:
   (A) 100 parts by weight of a polyoxymethylene resin; and
   (B) 0.1 to 10 parts by weight of (b-2) a polymer composed of an isocyanate compound and a polyalkylene oxide; provided that said ramp is a ramp for a hard disc.

18. The ramp according to claim 1, wherein said polymeric lubricant further comprises (b-1) a polyolefin resin.

19. The ramp according to claim 18, wherein said polyolefin resin (b-1) is a polyethylene selected from the group consisting of high-pressure low-density polyethylene, straight-chain low-density polyethylene, and ultra-low-density polyethylene; ethylene-propylene copolymer; ethylene-butene copolymer; or ethylene-octene copolymer, and has a melt flow rate in the range of 0.5 to 150 g/10 minutes, and wherein the polymer (b-2) obtained by polymerizing an isocyanate compound and a polyalkylene oxide has a weight average molecular weight of 10,000 to 500,000.

20. The ramp according to claim 18, wherein the polyoxymethylene resin (A) is a copolymer having a comonomer amount of 0.1 to 2.0 mole %.

21. The ramp according to claim 18, wherein the inorganic filler (C) is a spherical and smooth-surfaced filler having a volume average particle diameter of not more than 30 μm.

22. The ramp according to claim 18, wherein the inorganic filler (C) is an acicular, particulate or platy filler having a volume average particle diameter of not more than 10 μm.

23. The ramp according to claim 18, wherein the lubricant (D) is at least one selected from the group consisting of an alcohol, a fatty acid, an ester of an alcohol with a fatty acid, an ester of a dicarboxylic acid with an alcohol, a polyoxyalkylene glycol, and an olefin compound having an average polymerization degree of 10 to 500.

24. The ramp according to claim 18, wherein the ramp is used after it is washed with at least one solvent selected from the group consisting of halogen-containing solvents, aliphatic hydrocarbons, aromatic hydrocarbons, alcohols, liquefied carbon dioxide gas, surfactant-containing water, and pure water.

* * * * *